United States Patent [19]

Furuya et al.

[11] Patent Number: 4,933,615

[45] Date of Patent: Jun. 12, 1990

[54] DEVICE FOR DRIVING A ROOF-HATCH

[75] Inventors: Takeo Furuya; Nobolu Nabeta, both of Kanagawa, Japan

[73] Assignee: Jidosha Denki Kogyo Kabushiki Kaisha, Kanagawa, Japan

[21] Appl. No.: 282,772

[22] Filed: Dec. 12, 1988

[30] Foreign Application Priority Data

Dec. 21, 1987 [JP] Japan .............................. 62-192688[U]
Dec. 23, 1987 [JP] Japan .............................. 62-194031[U]

[51] Int. Cl.5 ................................................ B60J 7/08
[52] U.S. Cl. .................................... 318/466; 318/265; 318/468
[58] Field of Search ............... 318/256, 264, 265, 266, 318/286, 466, 467, 468

[56] References Cited

U.S. PATENT DOCUMENTS

| | | | |
|---|---|---|---|
| 3,702,430 | 11/1972 | Knetsch | 318/468 |
| 4,164,692 | 8/1979 | Mitterer et al. | 318/266 |
| 4,191,068 | 3/1980 | Jardin et al. | 251/129.03 X |
| 4,420,185 | 12/1983 | Bienert et al. | 49/324 X |
| 4,634,945 | 1/1987 | Takemura et al. | 318/266 X |

Primary Examiner—Bentsu Ro
Attorney, Agent, or Firm—Sughrue, Mion, Zinn, Macpeak & Seas

[57] ABSTRACT

A device for driving a roof-hatch includes a forwardly and reversely rotatable motor, an operation switch, a reduction mechanism having a friction clutch, and an auto-stopping device. The device makes it possible to facilitate the operation for opening or closing the roof-hatch and to prevent trouble in the running of the vehicle.

1 Claim, 6 Drawing Sheets

DEVICE FOR DRIVING A ROOF-HATCH

BACKGROUND OF THE INVENTION

1. Field of Invention

This invention relates to a device for driving a roof-hatch for opening and closing a lid of the roof-hatch which is provided in a roof of a vehicle.

2. Description of the Prior Art

Figure 7:
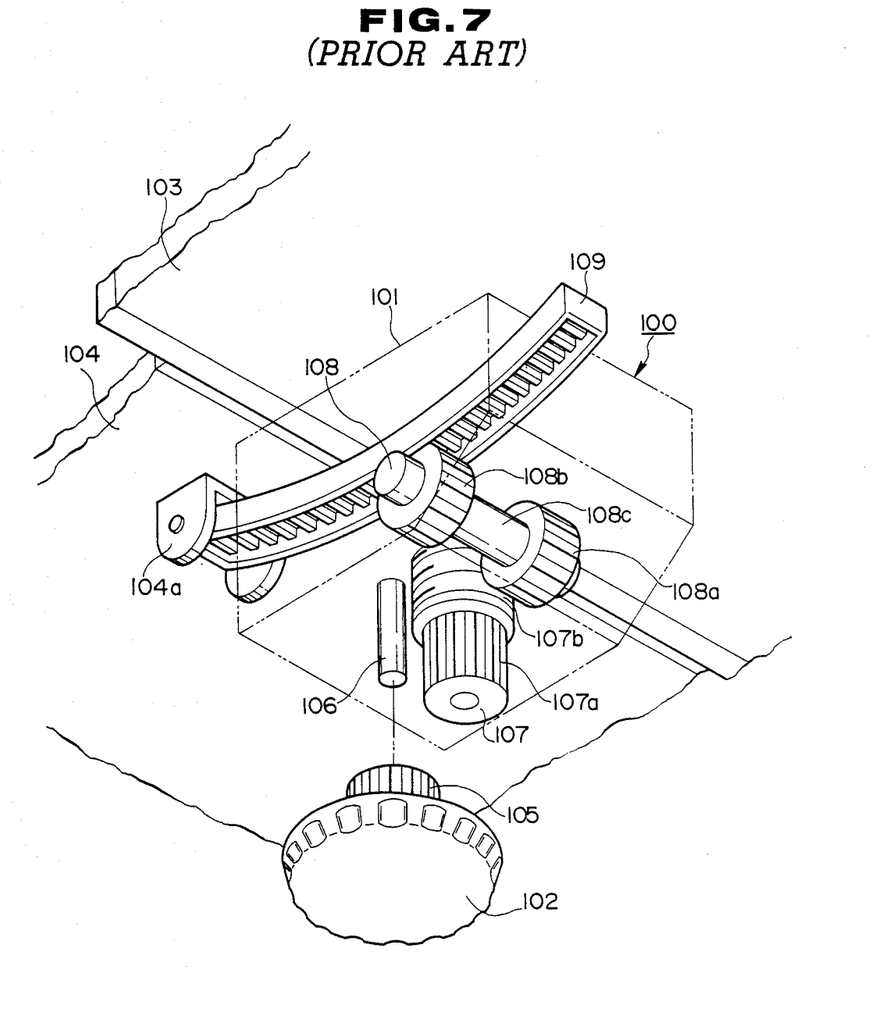
FIG. 7 is a perspective view illustrating the conventional device for driving the roof-hatch.

Heretofore, there has been used a device for driving a roof-hatch as shown in FIG. 7.

The device for driving the roof-hatch 100 shown in FIG. 7 has a knob 102 on the room side of a casing 101, which actuates a roof-hatch lid 104 forming a part of a roof 103 by tilting-up or tilting-down by manual turning of the knob 102. In the figure, numeral 105 is the first gear formed in a body with said knob 102, numeral 106 is a shaft supporting the knob 102 and said first gear 105 rotatably, numeral 107 is an intermediate gear having a gear part 107a engaged with the first gear 105 and a worm part 107b in a body, numeral 108 is an output shaft having a gear part 108a engaged with the worm part 107b of said intermediate gear 107 and a gear part 108b similar to said gear part 108a in shape, which connects the gear part 108a and 108b with a connecting shaft 108c, and numeral 109 is a rack attached to the roof rotatably to the roof-hatch lid 104 by a bracket 104a and engaged with said gear part 108b provided to the output shaft 108.

In the device for driving the roof-hatch 100 having the above mentioned structure, when the knob 102 rotates by manual turning, the rotation of the knob 102 is transmitted to the gear part 107 through the first gear 105, and so said intermediate gear 107 rotates. And the output shaft 108 rotates by transmitting the rotation to the gear part 108a provided to the output shaft 108 from the worm part 107b of the intermediate gear 107, so that the rotation of the gear part 108b provided to said output shaft 108 drives the rack 109 and operates the roof-hatch lid 104 into tilting-up or tilting-down. When the roof-hatch lid 104 reaches the top point of the tilting-up position, the rack 109 is disengaged and released from the gear part 108b of the output shaft 108 by unlocking the rack-lock system (not shown), and so said roof-hatch lid 104 is enabled to be detached from the roof 103.

In the aforementioned device for driving the roof-hatch 100, the driving force operating the lid 104 into tilting-up or tilting-down is obtained depending upon the reduction ratio of the knob 102 rotating manually that is the first gear 105 to the gear part 107a of the intermediate gear 107, the reduction ratio of the gear part 107b of the intermediate gear 107 to the gear part 108a of the output shaft 108 and reduction ratio of the gear part 108b of the output shaft 108 to the rack 109. Accordingly, it is necessary to increase said reduction ratios corresponding to the weight of the lid 104 and to toughen the strength of the respective gears. As the result, the device for driving the roof-hatch 100 is unavoidable scaling up the body, it can be an obstacle in the passenger compartment of the vehicle. In addition to above, there is a problem that the troublesome operation of the knob 102 interferes with the safe running of the vehicle, because the device for driving the roof-hatch 100 must be worked by the manual turning of said knob 102 repeatedly.

SUMMARY OF THE INVENTION

The present invention is made in view of the aforementioned problems of the prior art, an object of the invention is to solve such problems and to provide a device for driving a roof-hatch which is very simple in operation and is not an obstacle in safe running of the vehicle.

The device for driving the roof-hatch according to this invention is characterized by comprising a motor rotatable in a forward and reverse direction, an operation switch to supply a power to said motor, a reduction means to reduce and transmit a rotation of said motor to an output shaft driving a rack provided to a roof-hatch lid, which has a friction clutch transmitting said rotation of the output shaft, and if necessary, an auto-stopping means to stop said rack at a prescribed position automatically.

DESCRIPTION OF THE PREFERRED EMBODIMENT

The first embodiment of the device for driving the roof-hatch according to this invention will be explained on the basis of FIGS. 1 to 4.

Figure 3:
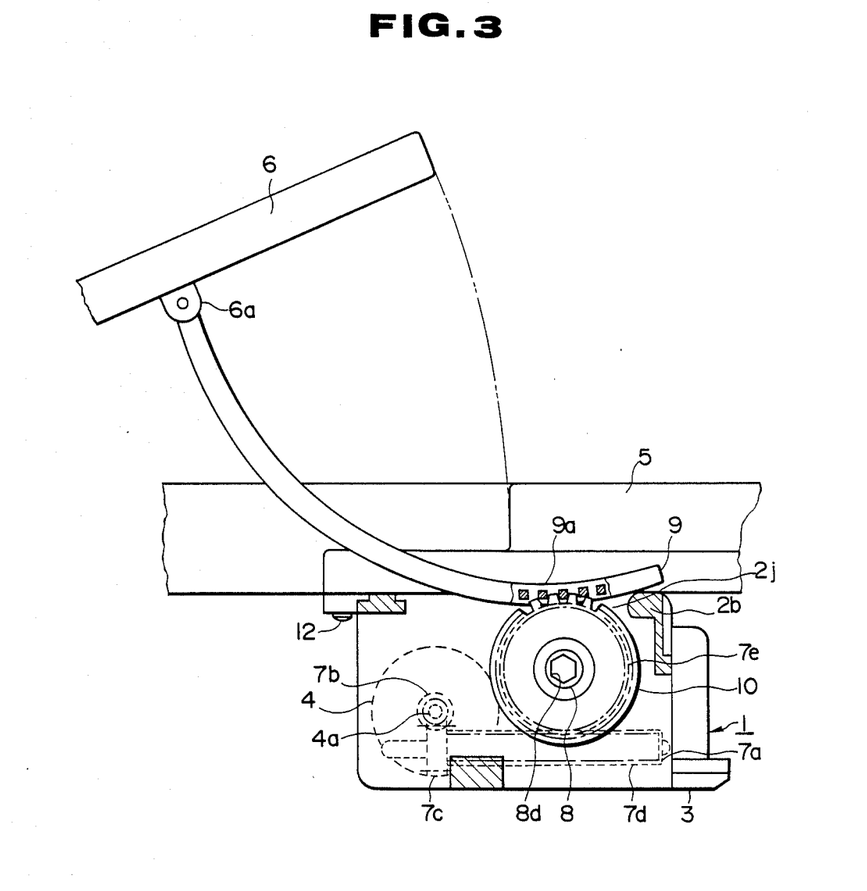
FIG. 3 is a vertical sectional side view of the circumference of the output gear illustrating the mounted appearance of the device for driving the roof-hatch shown in FIG. 1 to the roof.

The device for driving the roof-hatch 1 shown in figures is so structured as to rotate a motor 4 mounted in a casing 2 by controlling an operation switch 3 provided to the casing 2, and drive a roof-hatch lid 6 forming a part of a roof 5 shown in FIG. 3 into tilting-up or tilting-down. In the figures, numeral 7 is a reduction gear provided in the casing 2 and connected with said motor 4, numeral 8 is an output shaft provided to the casing 2, having a output gear 10 engaged with a rack 9 provided to said roof-hatch lid 6 and connected with said reduction gear 7, numeral 11 is a friction clutch intermits a rotation of said output shaft 8 from that of said motor 4.

Figure 1:
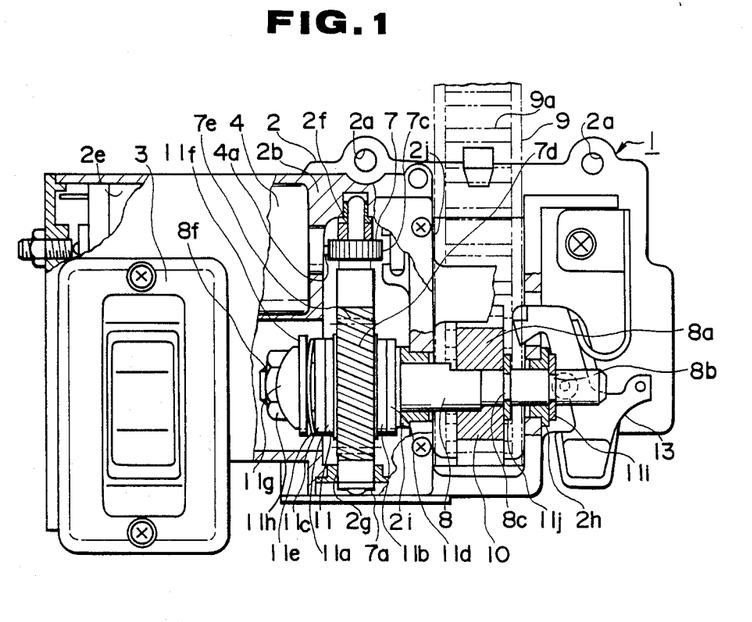
FIG. 1 is a partially sectional plan view of a first embodiment of the device for driving the roof-hatch according to the invention.

The casing 2 is a flat-shaped box comprising a base 2b provided with tapped holes 2a, 2a for mounting to the roof 5 shown in FIG. 3 with screws 12 and gear covers 2c and 2d attached to said base 2b. In FIG. 1, the base 2b is provided with a motor holding part 2e for housing the motor 4 in the position moved to upside from the left side shown in the figure, bearings 2f and 2g supporting rotatably either end of an intermediate shaft 7a composing a part reduction gear 7 in the nearly central position of the figure, bearings 2h and 2i supporting rotatably an output shaft 8 in the position moved to the right side from the center of the figure, and a rack transit 2j between said bearings 2h and 2i. And, in FIG. 2, the base 2b is provided with a switch attaching part 2k mounted an operation switch 3 in the upside position moved to the left side of the figure.

Figure 4:
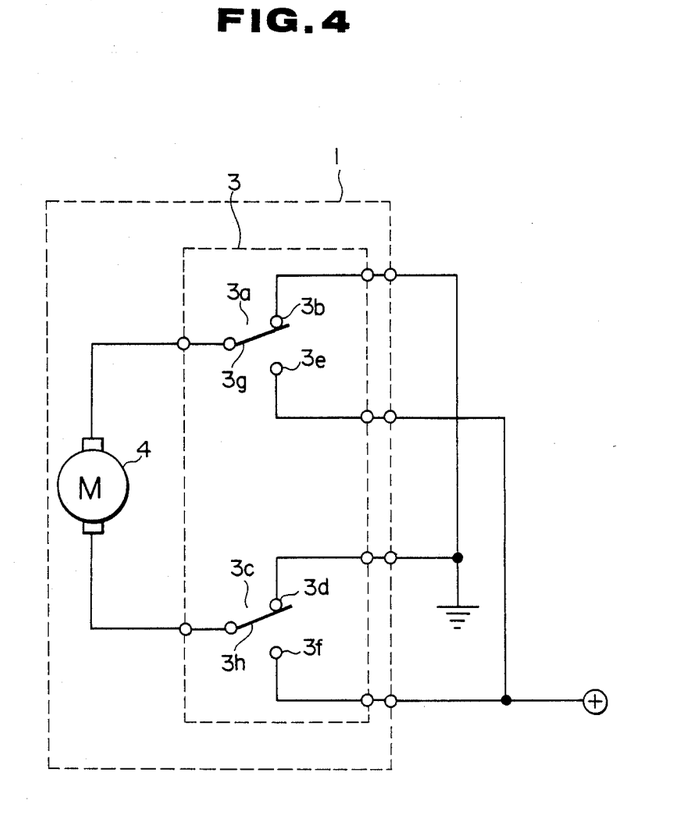
FIG. 4 is a circuit diagram illustrating the internal circuit of the device for driving the roof-hatch shown in FIG. 1.

Said operation switch 3 is a push-type bidirectional toggle switch housing an upside switch 3a and a down-side switch 3c, and provided with six terminals, which is fitted in said switch attaching part 2k provided in said base 2b. As shown in FIG. 4, a fixed contact 3b of said upside switch 3a and a fixed contact 3d of said down-side switch 3c are grounded, a fixed contact 3e of said upside switch 3a and a fixed contact 3f of said down-side switch 3c are connected to ⊕ terminal of a power source battery, and a movable contact 3g of said upside switch 3a and a movable contact 3h of said down-side switch 3c are connected to the motor 4. And, as long as said operation switch 3 is not operated, said movable contacts 3g and 3h are always in contact with said fixed contacts 3b and 3d respectively.

Said motor 4 is a small-sized DC motor rotatable in the forward and reverse direction, as shown in FIG. 1, which is housed in the motor holding part 2e of the base 2b, and of which a motor shaft 4a extends in the right side in the figure.

Hereupon, as shown in FIG. 3, the roof 5 is provided with the roof-hatch lid 6 tilting-up or tilting-down for opening or closing a part of said roof 5. Said roof-hatch lid 6 is provided movably through a bracket 6a on the inner side thereof with a rack which has cogs at equal intervals in the longitudinal direction.

On the one hand, said reduction gear 7 comprises a worm 7b attached to the motor shaft 4a shown in FIG. 3, the intermediate shaft 7a having a worm wheel part 7c and worm part 7d and supported rotatably by bearings 2f and 2g attached to the base 2b, and a worm wheel 7e pierced with the output shaft 8 in this embodiment. Said worm 7b is engaged with the worm wheel part 7c of the intermediate shaft 7a and the worm part 7d of the intermediate shaft 7a is engaged with said worm wheel 7e.

On the other hand, said friction clutch 11 consists of the output shaft 8 supported rotatably by bearings 2h and 2i attached to the base 2b, respective facings 11a and 11b made of frictional materials such as asbestos which are in contact with both sides of the worm wheel 7e pierced with said output shaft 8, respective lock plates 11c and 11d rotating said facings 11a and 11b with the output shaft 8 in a body, a belleville spring 11e pressing the facings 11a and 11b against the worm wheel 7e, a flat washer 11f, a lock washer 11g, a nut 11h and U-shaped clips 11i and 11j in this embodiment.

Figure 2:
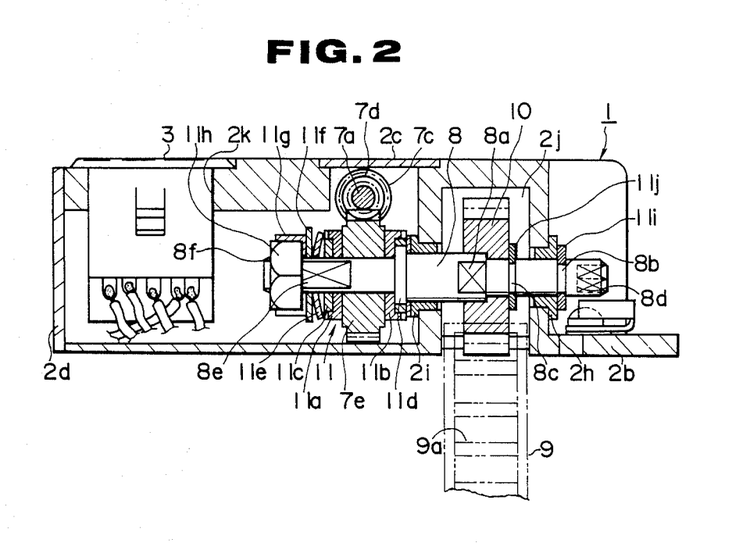
FIG. 2 is a vertical sectional side view illustrating the neighboring mechanism of the output shaft of the device for driving the roof-hatch shown in FIG. 1.

Said output shaft 8, as shown in FIG. 2, is provided with a cutting part 8a fitting in the output gear 10 and grooves 8b and 8c inserted with the U-shaped clips 11i and 11j on the position moved to the right side thereof, and a hexagonal hole 8d which receives a tool for driving said shaft 8 in an emergency on the right end thereof. And, the lock plate 11d is fixed in the nearly central position of said output shaft 8 in FIG. 2, a cutting part 8e fitting in the lock plate 11c, the belleville spring 11e and the flat washer 11f is provided on the left side in FIG. 2, and an exterior screw part 8f screwed with the nut 11h is provided at the left end in FIG. 2. That is, as shown in FIG. 2, on the left side of the plate 11d fixed to the output shaft 8, the facing 11b rotating with said lock plate 11d pierced with output shaft 8, and on the left side of the facing 11b the worm wheel 7e is pierced with the output shaft 8. And on the left side of said worm wheel 7e in FIG. 2, the facing 11a is pierced with the output shaft 8, and on the left side of said facing 11a in FIG. 2, the lock plate 11c which rotates with the output shaft 8 in a body by the cutting part 8e provided to the output shaft 8 and also rotates said facing 11a with the output shaft 8 in a body fits on the output shaft 8. Moreover, on the left side of said lock plate 11c in FIG. 2, the belleville spring 11e and the flat washer 11f fit on the cutting part 8e provided to the output shaft 8 so as to rotate with the output shaft 8, and on the left side of said flat washer 11f, the nut 11f is screwed through the lock washer 11g on the exterior screw part 8f provided to the output shaft 8.

In addition, on the right side of said output shaft 8 in FIG. 2, the output gear 10 fits on the cutting part 8a provided to the output shaft 8 and is fixed by inserting the U-shaped clip 11j into the groove 8c provided to the output shaft 8. And the U-shaped clip 11i is inserted into the groove 8b to the output shaft 8 at outside position of the bearing 2h so that the output shaft 8 may not get out of place.

As shown in FIG. 3, the rack 9 provided to the roof-hatch lid 6 is made to engage with the output gear 10 in the rack transit provided to casing 2. And, numeral 13 shown in FIG. 1 is a locking gadget used to lock the full-opened hatch lid 6 by engaging with rack 9.

The device for driving the roof-hatch 1 having aforementioned structure works as following explanation.

In the first place, by pushing a button of the operation switch 3 in the tilting-up (opening) direction at a state that the roof-hatch lid 6 is closed, the movable cotact 3g of the upside switch 3a shown in FIG. 4 is made to contact with the fixed contact 3e. Thereupon, a circuit from ⊕ terminal of the power source battery to the ground through the fixed contact 3e → movable contact 3g → motor 4 → movable contact 3h of the down-side switch 3c fixed contact 3d is made, a forword-directional power is supplied for the motor 4, and the motor 4 rotates in the forword direction. And the rotation is transmitted to the worm wheel part 7c provided to the intermediate shaft 7a from the worm 7b attached to the motor shaft 4a of the motor 4, and said intermediate shaft 7a rotates. Thereby, said rotation is transmitted to the worm wheel 7e from the worm part 7d provided to the intermediate shaft 7a, and the worm wheel 7e rotates. On the both sides of the worm wheel 7e in FIG. 2, because facings 11a and 11b fit on the output shaft 8 by lock plates 11c and 11d pressed with the belleville spring 11e, the rotation of said worm wheel 7e is intermitted to the lock plates 11c and 11d through the facings 11a and 11b, and so the output shaft 8 rotates. Thereby the output gear 10 fitted on the output shaft 8 rotates, and drive the rack 9, so that it makes the roof-hatch lid 6 open (tilting-up).

At this state, by operating said lock gadget 13 in the releasing direction, and disengaging the rack 9 from the output gear 10, the roof-hatch lid 6 can be taken off from the roof 5.

In the next place, by pushing the button of the operation switch 3 in the tilting-down (closing) direction at a state that the roof-hatch lid 6 is opened (tilting-up), the movable contact 3h of the down-side switch 3c shown in FIG. 4 is made to contact with the fixed contact 3f. Thereupon, a circuit from ⊕ terminal of the power source battery to the ground through the fixed contact 3f→ movable contact 3h→ motor 4→ movable contact 3g of the upside switch 3a→ fixed contact 3b is made, and a reverse- directional power is supplied for the motor 4, thereby the motor 4 rotates in the reverse direction. And the reverse rotation of the motor 4 is transmitted in the same manner as aforementioned action of tilting-up, the roof-hatch lid 6 is made to close (tilting-down).

Thereupon, if an obstacle is caught between roof-hatch lid 6 and roof 5 in the tilting-down (closing) process of the roof-hatch lid 6, each of the facing 11a and 11b pressed against the worm wheel 7e slides on the worm wheel 7e respectively because the output gear 10 engaged with the rack 9, that is, the output shaft 8 is impeded to rotate. Therefore, the rotation of the motor 4 is not transmitted to the output shaft 8 and the output gear 10, but intercepted.

And when driving the roof-hatch lid 6 into tilting-up or tilting-down in case of the accident such as the case the battery dies, by turning the crank-shaped driving tool (not shown) inserted into the hexagonal hole 8d provided to the right end of the output shaft 8 shown in FIG. 2, the output shaft 8 is made to rotate as the facings 11a and 11b slides on the worm wheel 7e, thereby the output gear 10 rotates and the roof-hatch lid 6 is made to open (tilting-up) or close (tilting-down).

Figure 5:
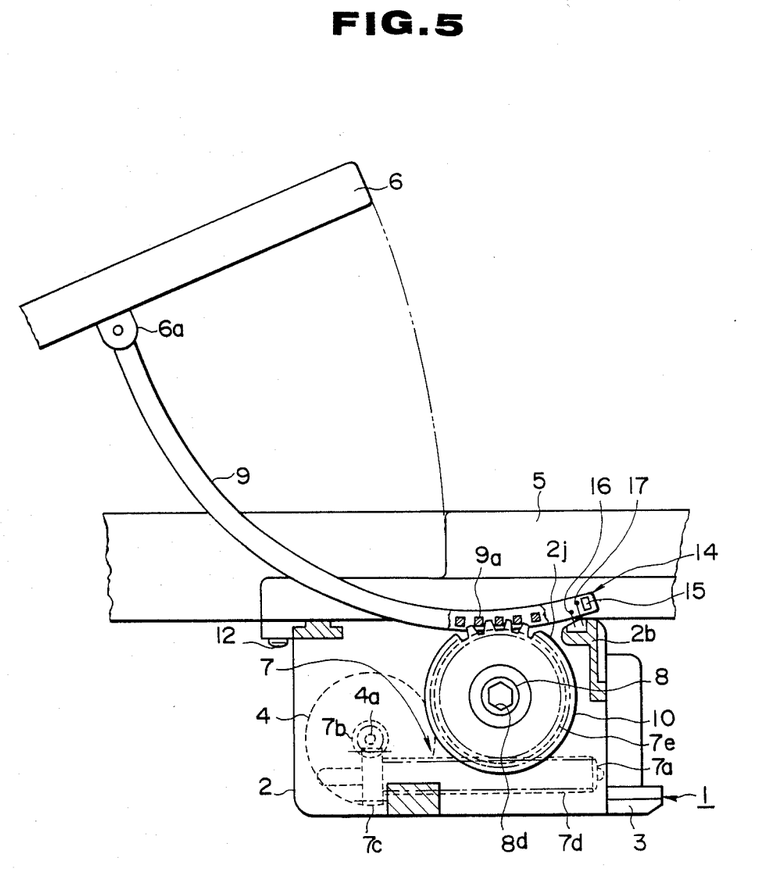
FIG. 5 is a vertical sectional side view showing the mounting position of the auto-stopping mechanism in the second embodiment of the device for driving the roof-hatch according to this invention.

The second embodiment of the device for driving the roof-hatch according to this invention will be explained on the basis of FIG. 5 and FIG. 6.

In the second embodiment, the device for driving the roof-hatch 1 has the same structure as that of aforementioned first embodiment shown FIG. 1 and FIG. 2 substantially, and further provided with an auto-stopping means. Namely, in this embodiment, the auto-stopping means 14 consists mainly of a conductible contact plate 15 attached to the side part of the right end of the rack 9 shown in FIG. 5, contactors 16 and 17 touching said contact plate 15, a relay RL having a relay contact rl, and a traveling contact $rl_2$ as shown in FIG. 6, and a main switch 18. As shown in FIG. 5 said contactors 16 and 17 is attached respectively to the base 2b at the position moved to the upside in the right-hand of the casing 2 in the figure in this embodiment. And as shown in FIG. 6, the contactor 16 is connected to a fixed contact 18a of the main switch 18 through a relay coil rlc of said relay RL, a moving contact 18b of said main switch 18 is connected to the ⊕ terminal of the power source battery, furthermore the contractor is grounded.

First of all, by switching the main switch 18 on at the state that the roof-hatch lid 6 is closed, the movable contact 18b is made to contact with the fixed contact 18a of the main switch 18.

Figure 6:
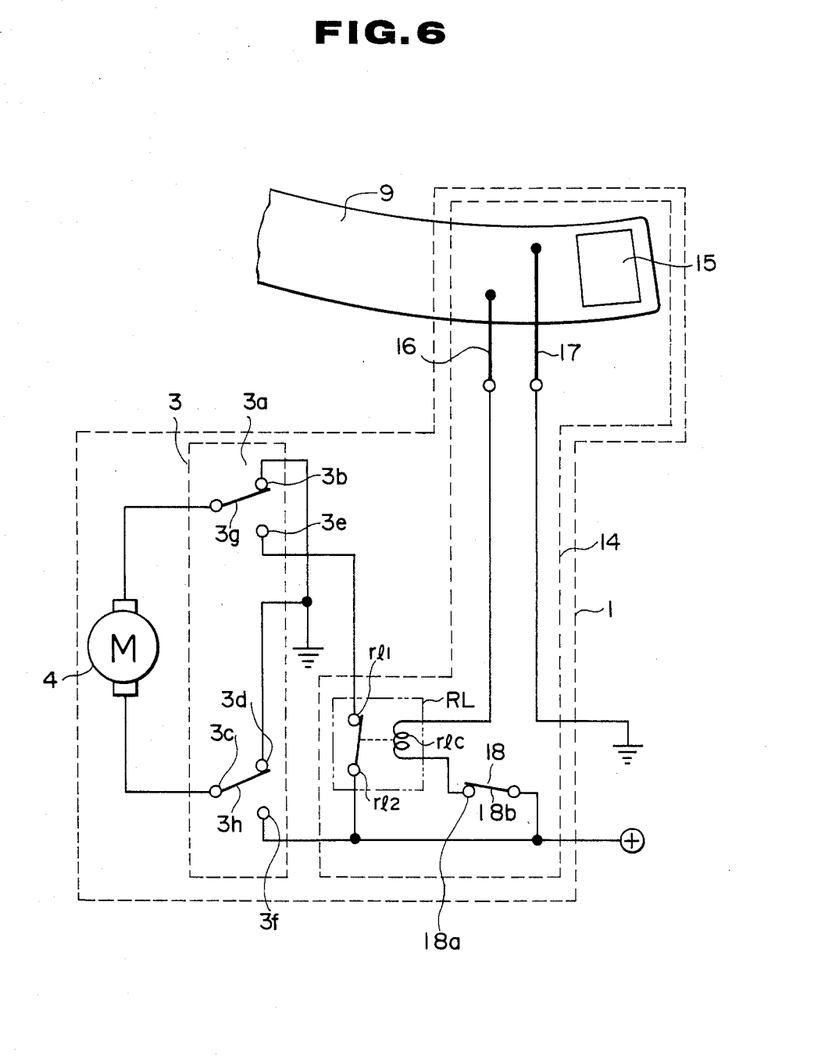
FIG. 6 is a circuit diagram illustrating the internal circuit of the device for driving the roof-hatch shown in FIG. 5.

Then, by pushing a button of the operation switch 3 in the tilting-up (opening) direction, the movable contact 3g of the upside switch 3a shown in FIG. 6 is made to shift to the fixed contact 3e from the fixed contact 3b. Thereby a circuit from ⊕ terminal of the power source battery to the ground through the traveling contact $rl_2$ of the relay RL→ relay contact $rl_1$→fixed contact 3e of the upside switch 3a→ movable contact 3g→ motor 4→ movable contact 3h of the down-side switch 3c→ fixed contact 3d is made, a forward-directional power is supplied for the motor 4, and so the motor 4 rotates in the forward direction. And the rotation is transmitted to the output gear 10 through the intermediate shaft 7a and the output shaft 8 in the same way as that aforementioned for the first embodiment of the device for driving the roof-hatch according to this invention. Thereby, the rack 9 is driven in the leftward direction in FIG. 5, so that the roof-hatch lid 6 is made to open (tilting-up).

When the roof-hatch lid 6 reaches to the full-opened state, respective contactors 16 and 17 are in contact through the contact plate 15 attached to the rack 9 and these contactors 16 and 17 is connected electrically. And then, the electric current flows to the ground from the ⊕ terminal of the power source battery through the movable contact 18b of the main switch 18→ fixed contact 18a→ relay coil rlc of the relay RL→ contactor 16→ contact plate 15→ contactor 17, the traveling contact $rl_2$ of the relay RL is made to alienate from the relay contact $rl_1$ by the relay coil rlc excited by said electric current. Consequently, the electric current supplied to the fixed contact 3e of the upside switch 3a from the ⊕ terminal of the power source battery is interrupted, the motor 4 stops in consequence of the interruption of power supply.

Namely, the operator of the device for driving the roof-hatch 1 can recognize that the roof-hatch lid 6 reaches to the full-opened state by finding the stop of the motor 4, at this state said operator can take off the roof-hatch lid 6 from the roof 5 by operating the lock gadget 13 in the releasing direction and disengaging the rack 9 from the output gear 10.

Next, by pushing the button of the operation switch 3 in the tilting-down (closing) direction at the state that the roof-hatch lid 6 is opened (tilting-up), the movable contact 3h of the down-side switch 3c shown in FIG. 6 is made to shift to the fixed contact 3f from the fixed contact 3d. Thereby, a circuit from ⊕ terminal of the power source battery to the ground, through the fixed contact 3f of the down-side switch 3c → movable contact 3h→ motor 4→ movable contact 3g of the upside switch 3a→ fixed contact 3b is made, a reverse-directional power is supplied for the motor 4, and so the motor 4 rotates in the reverse direction. And reverse rotation of the motor 4 is transmitted to the output gear 10, and drives the rack 9 in the right-ward direction in FIG. 5, so that the roof-hatch lid 6 is made to close (tilting-down).

As explained above, the device for driving the roof-hatch according to this invention comprises the forwardly and reversely rotatable motor, the operation switch to supply the power to said motor, the reduction means to reduce and transmit the rotation of said motor to the output shaft driving the rack provided to the roof-hatch lid, which has a friction clutch transmitting said rotation of the output shaft. This device is miniaturized as compared with the conventional type, and driven by the motor at that, therefore it is possible to facilitate the operation and relieve the trouble in the running of the vehicle.

Furthermore, the rack can be made to stop automatically at predetermined position by attaching the auto-stopping means according to demand, thereby a highly desirable effect is obtained to improve the facility of the operation still more.

What is claimed is:
1. A device for driving a roof-hatch comprising:
  a motor rotatable in a forward and reverse direction;
  an operation switch for supplying power to said motor;
  reduction means for reducing and transmitting rotation of said motor to an output shaft driving a rack secured to a roof-hatch lid;

said reduction means having a friction clutch for transmitting a rotation of said output shaft; and
auto-stopping means for stopping said rack at a prescribed position automatically;
said auto-stopping means comprising a contact plate secured to said rack and a contactor disposed in engagement with said contact plate.

* * * * *